United States Patent
Badger et al.

(10) Patent No.: US 11,976,635 B2
(45) Date of Patent: May 7, 2024

(54) HEATING A WIND TURBINE BLADE

(71) Applicant: VESTAS WIND SYSTEMS A/S, Aarhus N (DK)

(72) Inventors: Paul Badger, Salisbury (GB); Luke Spandley, Ventnor (GB)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 111 days.

(21) Appl. No.: 17/633,504

(22) PCT Filed: Aug. 4, 2020

(86) PCT No.: PCT/DK2020/050225
§ 371 (c)(1),
(2) Date: Feb. 7, 2022

(87) PCT Pub. No.: WO2021/023354
PCT Pub. Date: Feb. 11, 2021

(65) Prior Publication Data
US 2022/0349387 A1 Nov. 3, 2022

(30) Foreign Application Priority Data
Aug. 5, 2019 (DK) .......................... PA 2019 70496

(51) Int. Cl.
*F03D 80/40* (2016.01)
*F03D 1/06* (2006.01)
(52) U.S. Cl.
CPC .......... *F03D 80/40* (2016.05); *F03D 1/0675* (2013.01)

(58) Field of Classification Search
None
See application file for complete search history.

(56) References Cited

U.S. PATENT DOCUMENTS

| | | | | |
|---|---|---|---|---|
| 5,824,996 | A * | 10/1998 | Kochman | A41D 13/0051 338/211 |
| 7,078,658 | B2 * | 7/2006 | Brunner | B64D 15/12 219/520 |
| 10,201,039 | B2 * | 2/2019 | Barfuss | H01C 17/0652 |
| 2005/0189345 | A1 * | 9/2005 | Brunner | B64D 15/12 219/548 |

(Continued)

FOREIGN PATENT DOCUMENTS

| | | |
|---|---|---|
| CN | 208138098 U | 11/2018 |
| EP | 2667025 A1 * | 11/2013 .......... F03D 11/0025 |

(Continued)

OTHER PUBLICATIONS

Danish Patent and Trademark Office, 1st Technical Examination including The Search Report and Search Opinion for Application PA 2019 70496 dated Jan. 28, 2020.

(Continued)

*Primary Examiner* — Juan G Flores
(74) *Attorney, Agent, or Firm* — Patterson + Sheridan, LLP (57) ABSTRACT

A wind turbine blade having an electro-thermal heating element is provided. The electro-thermal heating element has a sheet of electrically resistive material, which is folded so as to provide a plurality of heat zones. Each heat zone includes one or more layers of the sheet. At least two of the heat zones have a different number of layers of the sheet.

19 Claims, 7 Drawing Sheets

(56) References Cited

U.S. PATENT DOCUMENTS

2013/0022466 A1    1/2013  Laurberg
2013/0186884 A1*  7/2013  Barfuss .............. H01C 17/0652
                                                          219/544

FOREIGN PATENT DOCUMENTS

| EP | 2667025 A1 | 11/2013 |
| --- | --- | --- |
| EP | 3285545 A1 | 2/2018 |
| WO | 2011127995 A1 | 10/2011 |
| WO | 2017190748 A1 | 11/2017 |
| WO | 2021023354 A1 | 2/2021 |

OTHER PUBLICATIONS

PCT, International Search Report and Written Opinion of The International Searching Authority for Application PCT/DK2020/050225 dated Oct. 22, 2020.
Office Action for Canadian Patent Application No. 3,149,409, dated Nov. 22, 2023, 5 pgs.

* cited by examiner

HEATING A WIND TURBINE BLADE

FIELD OF THE INVENTION

The present invention relates to a wind turbine blade and a method of heating a wind turbine blade.

BACKGROUND OF THE INVENTION

In response to the risk of a build-up of ice on its surface, a wind turbine blade is conventionally heated using heating elements. Different portions of the blade experience different levels of ice build-up. For example, more ice typically forms at the blade tip. Therefore, different requirements (e.g. heating element temperature output; size and shape of the heating elements) are needed for different portions of the blade.

A conventional heating device is disclosed in EP-A1-3285545. The heating device comprises an electrically conductive fabric and first and second electrical connections. The first and second electrical connections are each connected to the conductive fabric at a first end of the device. When the electrical connections are connected to a power source, current flows from the first electrical connection, through the conductive fabric and to the second electrical connection, thereby generating heat.

SUMMARY OF THE INVENTION

A first aspect of the invention provides a wind turbine blade comprising an electro-thermal heating element, the electro-thermal heating element comprising a sheet of electrically resistive material which is folded so as to provide a plurality of heat zones, each heat zone comprising one or more layers of the sheet, wherein at least two of the heat zones have a different number of layers of the sheet.

Providing at least two of the heat zones with a different number of layers of the folded sheet enables the heat flux generated by the electro-thermal heating element to be tailored as required.

The electrically resistive material may be an electrically conductive resistive material, so as to provide resistive heating when an electric current is passed through it.

The electrically resistive material may comprise a veil of fibres, such as a veil of carbon fibres. Alternatively the electrically resistive material may comprise a metal mesh or other material.

Each layer of the sheet may be separated from adjacent layers of the sheet in the same heat zone by an insulating material. The insulating material may comprise an insulating layer, the insulating layer being folded so as to provide the insulating material between the adjacent layers of the sheet. Alternatively or additionally, there may be a number of separate (folded or unfolded) insulating layers that provide the insulating material.

The insulating material may be adhered to the sheet, for instance as a coating, or it may not be adhered the sheet.

The electro-thermal heating element may be configured to heat the wind turbine blade with different heat fluxes in the at least two of the heat zones, the heat flux typically increasing with the number of layers in the heat zone.

The electro-thermal heating element may be configured to heat the wind turbine blade such that the at least two of the heat zones are configured to simultaneously output a different heat flux.

The heating element may comprise a pair of electrical connectors at opposite ends of the sheet. The pair of electrical connectors may be configured to apply a voltage across the sheet, which may be a DC voltage or an AC voltage.

At least one of the electrical connectors may be a busbar. Both of the electrical connectors may be busbars.

The sheet may be folded along one or more fold lines. The fold line(s) may be parallel to the busbar(s), at an oblique angle to the busbar(s) or perpendicular to the busbar(s).

The sheet may be folded about one or more fold lines which are parallel or perpendicular to the busbar(s).

The pair of electrical connectors may be at opposite ends of a length of the sheet. The length may be the longest dimension of the sheet.

The sheet may be folded along its length and/or across its width.

The width of the sheet may vary along the length of the sheet, or it may be constant.

The width of the sheet may vary in one or more steps; or the width may vary continuously so that the sheet is gradually tapered.

The sheet may be folded in a series of folds with alternating folding directions, or in a series of folds with the same folding directions. The sheet may also be folded in a series of folds having a mix of the same and alternating folding directions.

The sheet may be folded at least twice, about two or more fold lines. This can increase the number of layers in at least one of the heat zones, enabling a wider range of heat flux between the different heat zones.

The sheet may be folded an odd number of times, about an odd number of fold lines. This may give the advantage of bringing the pair of electrical connectors closer to each other than they would be with the sheet in its un-folded state.

Each of the at least two of the heat zones may have a plurality of layers of the sheet, or one of the at least two heat zones may have only a single layer of the sheet.

The wind turbine blade may comprise a blade shell, wherein the blade shell has a thickness direction. The layers of the sheet may be folded so that they form a stack in the thickness direction of the blade shell. The electro-thermal heating element may be embedded in the blade shell or otherwise mounted to the blade shell.

A further aspect of the invention provides a wind turbine comprising a wind turbine blade according to the first aspect.

A further aspect of the invention provides a method of heating a wind turbine blade, the wind turbine blade comprising an electro-thermal heating element, the electro-thermal heating element comprising a sheet of electrically conductive material which is folded to provide a plurality of heat zones, each heat zone comprising one or more layers of the sheet, wherein at least two of the heat zones have a different number of layers of the sheet, the method comprising: powering the heating element such that the at least two of the heat zones heat the wind turbine blade with different heat fluxes.

A further aspect of the invention provides a method of tailoring a heat flux output by an electro-thermal heating element of a wind turbine blade, the electro-thermal heating element comprising a sheet of electrically resistive material, the method comprising: identifying heating requirements of the wind turbine blade; and folding the sheet of electrically resistive material so that a heat flux generated by the electro-thermal heating element is tailored to the heating requirements, wherein the sheet of electrically resistive material is folded to provide a plurality of heat zones, each heat zone comprising one or more layers of the sheet, and wherein at least two of the heat zones have a different number of layers of the sheet.

The heating requirements may comprise an amount of heat flux generated in each of the heat zones, and/or a size of the heat zones, and/or a shape of the heat zones, and/or a number of the heat zones, and/or desired locations of the heat zones.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
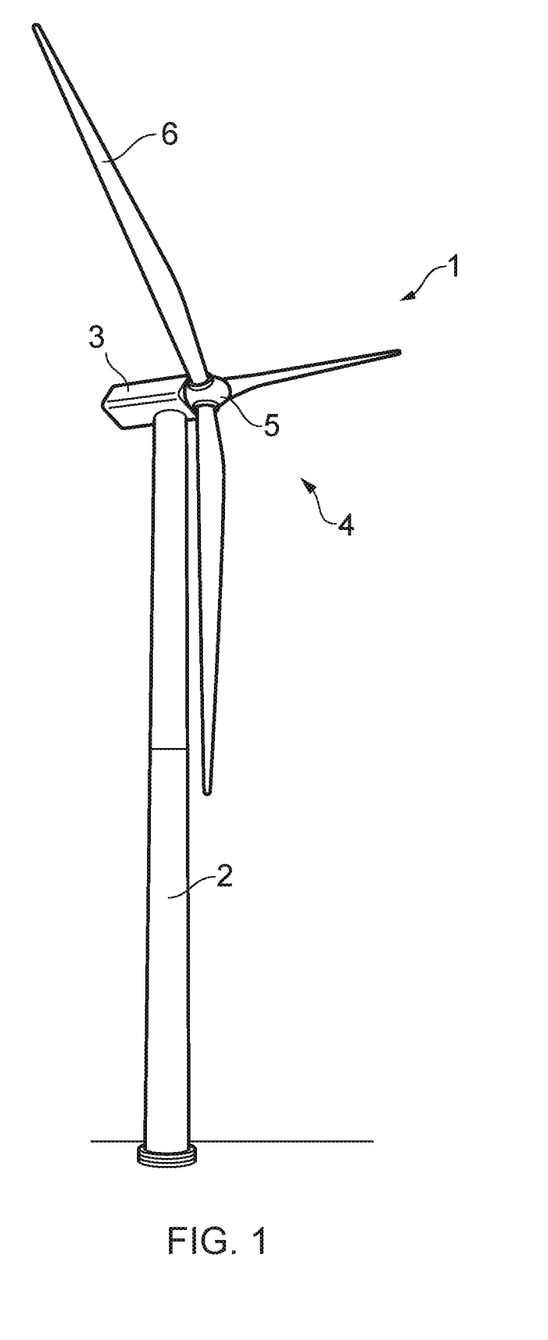
FIG. 1 shows a wind turbine.

FIG. 1 illustrates, in a schematic perspective view, a wind turbine 1. The wind turbine 1 includes a tower 2. a nacelle 3 at the apex of the tower, and a rotor 4 operatively coupled to a generator housed inside the nacelle 3. In addition to the generator, the nacelle houses miscellaneous components required for converting wind energy into electrical energy and various components needed to operate, control, and optimize the performance of the wind turbine 1. The rotor 4 of the wind turbine includes a central hub 5 and a plurality of blades 6 that project outwardly from the central hub 5. In the illustrated embodiment, the rotor 4 includes three blades 6, but the number may vary, for example the rotor 4 may have two or four blades 6. Moreover, the wind turbine 1 comprises a control system. The control system may be placed inside the nacelle 3 or distributed at a number of locations inside the turbine 1 and communicatively connected.

The wind turbine 1 may be included among a collection of other wind turbines belonging to a wind power plant, also referred to as a wind farm or wind park, that serve as a power generating plant connected by transmission lines with a power grid. The power grid generally consists of a network of power stations, transmission circuits, and substations coupled by a network of transmission lines that transmit the power to loads in the form of end users and other customers of electrical utilities.

Figure 2A:
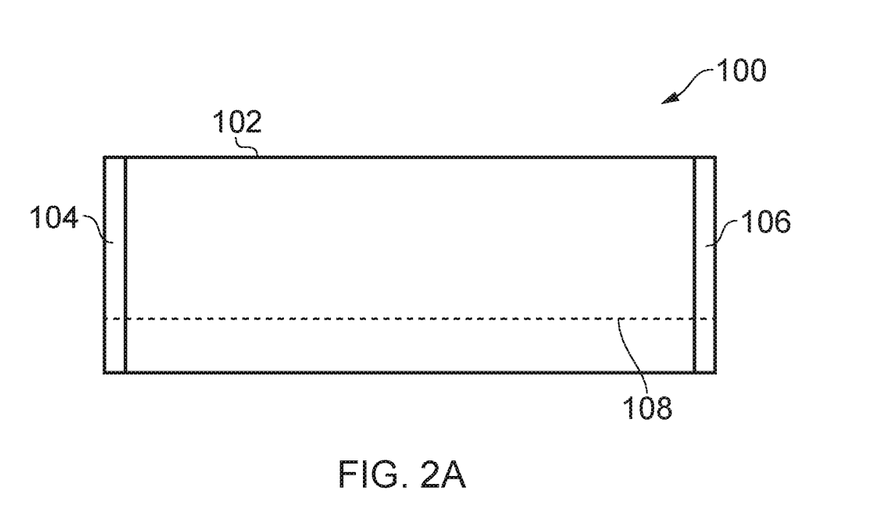
FIG. 2A shows an electro-thermal heating element in an unfolded configuration.

FIG. 2A shows an electro-thermal heating (ETH) element 100. The ETH element 100 comprises a sheet 102 of electrically resistive material. The material is conductive and resistive, such that when a current is passed through the sheet 102, the resistance in the material causes heat to be generated, in what is commonly known as resistive heating, Joule heating or Ohmic heating. The sheet 102 may comprise a veil of fibres, such as carbon fibres.

The ETH element 100 comprises a supply connector 104 and a return connector 106 at opposite ends of the sheet 102. Each of the supply and return connectors 104, 106 may be busbars or point contacts, for example, depending on the dimensions of the sheet 102. In the arrangement illustrated in FIG. 2A, the supply and return connectors 104, 106 are both busbars.

The ETH element 100 is embedded in a blade shell of one of the blades 6. The blade further typically comprises a power system that controls the heat provided to the blade 6. When the power system is activated, current is supplied through the supply connector 104 and passes through the sheet 102 to the return connector 106.

Being a rectangular heating element, the ETH element 100 generates a uniform heat flux across its entire surface, subject to manufacturing tolerances.

In order to customise the heat flux output, the sheet 102 is folded about a single fold line 108. The fold line 108 is perpendicular to the busbars 104, 106, and runs along a full length of the sheet 102 and through both busbars. The result is shown in FIG. 2B.

Figure 2B:
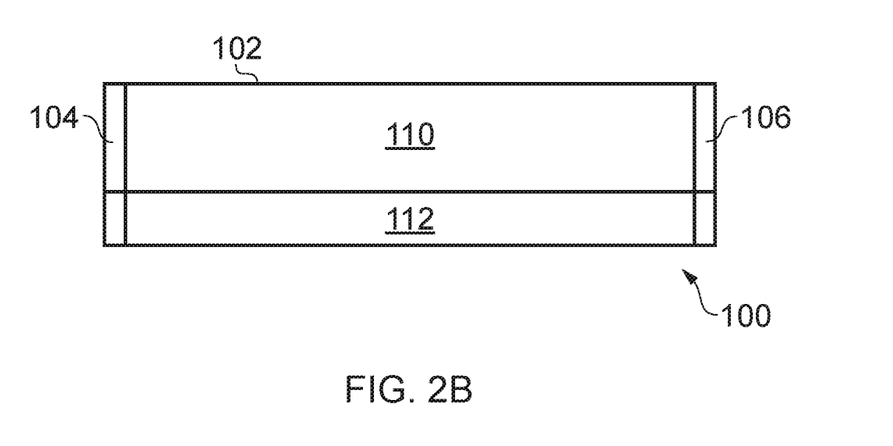
FIG. 2B shows the electro-thermal heating element of FIG. 2A in a folded configuration.

As can be seen in FIG. 2B, the folded ETH element 100 comprises two heat zones 110, 112. The first heat zone 110 comprises a single layer of the sheet 102 and the second heat zone 112 comprises a stack of two layers of the sheet 102. Therefore, the two heat zones 110, 112 have a different number of layers of the sheet 102.

As a result, when the ETH element 100 is powered, the two heat zones 110, 112 will output different heat fluxes. The first heat zone 110 will output a heat flux that equals the uniform heat flux of the ETH element 100 when it is unfolded, as the first heat zone 110 only has a single layer. However, the second heat zone 112 has two layers so will output a higher heat flux than the heat flux output by the first heat zone 110. The heat flux output by the second heat zone 112 may be twice the heat flux output by the first heat zone 110.

Folding the ETH element 100 allows the heat flux output by the ETH element 100 to be tailored and customised to requirements (e.g. the amount of heat flux generated, size and shape of the heat zone, etc.). For example, by folding the ETH element 100 in the required manner, any number of heat zones each having the desired shape and heat flux output can be provided at desired locations.

This may be useful, for example, for providing a greater heat flux at the blade tip where there is a risk of more significant ice build-up.

Insulating material, such as glass fibre, may or may not be provided between the two layers of the sheet 102 in the second heat zone 112. Such insulating material may be adhered as a coating to the upper side of the sheet 102, or it may be provided as a separate layer that may be unattached to the ETH element 100.

If insulating material is not provided, then the two layers of the sheet in the second heat zone 112 will be in electrical contact and will have a similar electrical resistance to a single layer with double thickness.

Figure 3A:
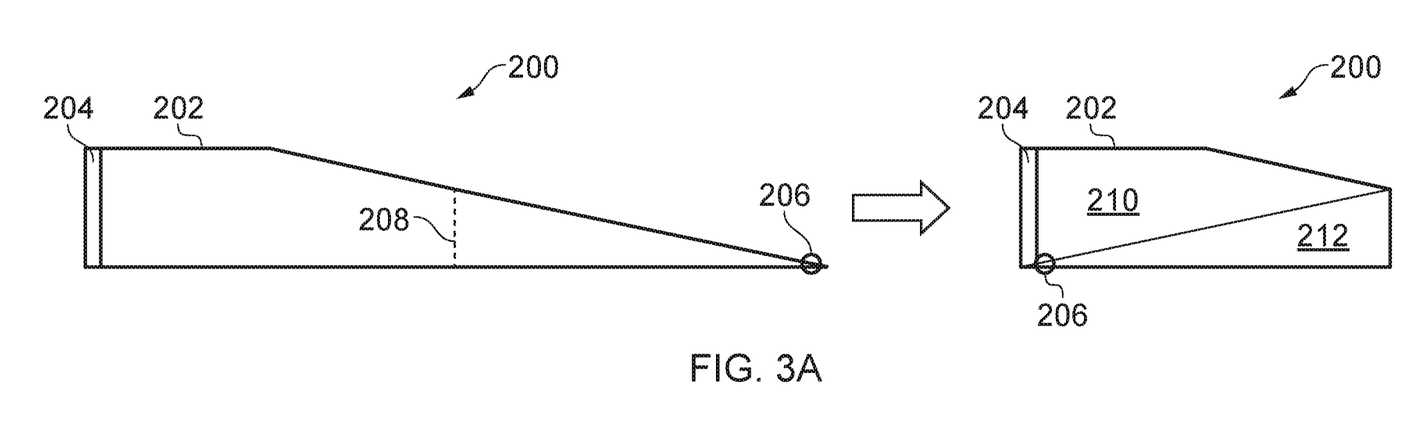
FIG. 3A shows a tapered electro-thermal heating element in unfolded and folded configurations.

FIG. 3A shows an ETH element 200, in unfolded and folded configurations. The ETH element 200 comprises a sheet 202 of electrically resistive material, as described above. The ETH element 200 further comprises a supply connector 204, which is a busbar, and a return connector 206, which is a point contact. The connectors 204, 206 are at opposite ends of the sheet 202.

The sheet 202 has a width which varies between the opposite ends of the sheet, so that the sheet 202 is partially tapered. By tapered, it is meant that its width of the sheet 102 at one point along the length of the ETH element 200 is different to its width at another point along the length of the ETH element 200. The length of the ETH element 200 refers in this case to its longest dimension and the width of the ETH element 200 refers in this case to the dimension perpendicular to its length. Being a substantially two dimensional object, it is clear that the third orthogonal dimension, i.e. thickness, is the smallest dimension. In the ETH elements 100, 200 shown in FIGS. 2A and 3A, the width is the dimension parallel to the direction defined by the busbars 104, 106, 204.

The ETH element 200 has a substantially constant width close to the supply connector 204, for approximately 25% of its total length. Beyond this point, the width decreases continuously to the point of the return connector 206. The result is that, when current passes through the sheet 202, the current density is higher in the portions of the sheet 202 having a smaller width than the portions having a greater width. As a result, the heat flux generated in the areas of high current density, i.e. smaller width, will be higher than the heat flux generated in the areas of lower current density, i.e. greater width.

For example, a portion of the sheet 202 proximate to the return connector 206 will generate a higher heat flux than a portion of the sheet 202 proximate to the supply connector 204. This is because the portion of the sheet 202 proximate to the return connector 206 has a smaller width than the portion of the sheet proximate to the supply connector 204. Such tapering allows for even greater customisation of the heat flux from the various heat zones.

As can be seen in the folded configuration of FIG. 3A, the sheet 202 has been folded across its width about a single fold line 208 to define two heat zones 210, 212. Similarly to the arrangement described above, the first heat zone 210 has a single layer of the sheet 202, and the second heat zone 212 has a stack of two layers of the sheet 202.

The fold line 208 runs across the width of the sheet 202, parallel to the busbar 204.

Due to the tapered width of the sheet 202, the average heat flux generated in the second heat zone 212 will be more than twice the average heat flux generated in the first heat zone 210.

Figure 3B:
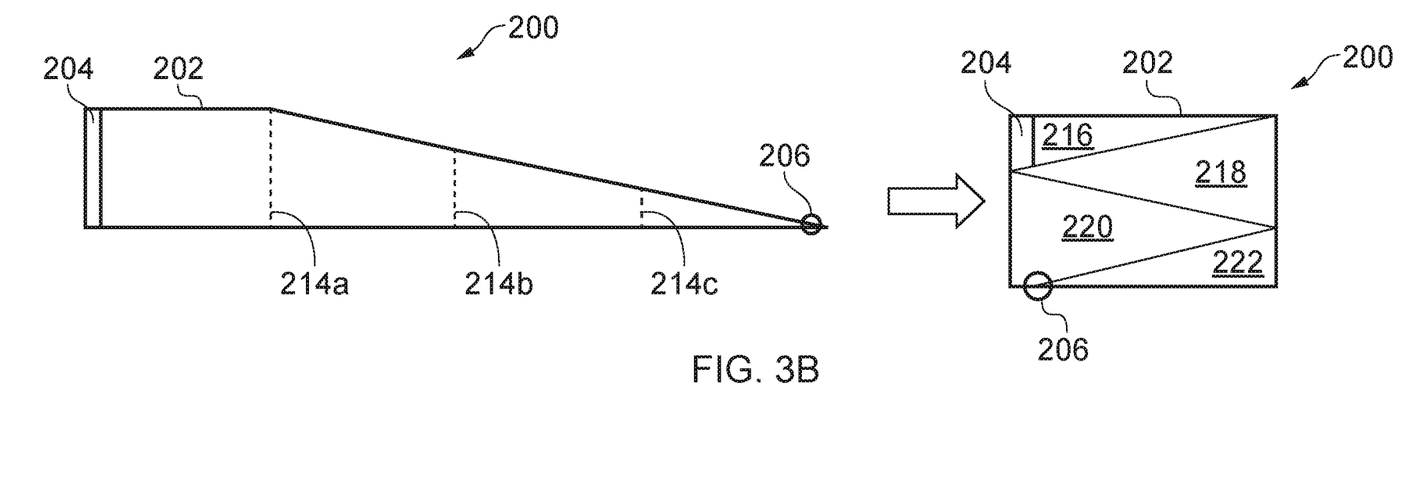
FIG. 3B shows a tapered electro-thermal heating element in unfolded and folded configurations.

FIG. 3B shows the same ETH element 200 in unfolded and folded configurations, but this time folded across its width in alternating directions (i.e. concertina-like folding) about three fold lines 214a, 214b, 214c. Each fold line 214a-c runs across the width of the sheet 202, parallel to the busbar 204.

The result is a folded ETH element 200 having four heat zones 216, 218, 220, 222. The first heat zone 216 has a single layer of the sheet 202. The second heat zone 218 has a stack of two layers of the sheet 202. The third heat zone 220 has a stack of three layers of the sheet 202, and the fourth heat zone 222 has a stack of four layers of the sheet 202. Therefore each heat zone 216, 218, 220, 222 comprises one or more layers of the sheet 202, and each of the heat zones 216, 218, 220, 222 have a different number of layers.

In this arrangement, the folded ETH element 200 is capable of outputting heat flux in a highly customised manner. Each of the four heat zones 216, 218, 220, 222 has a specific shape and heat flux output when a current is passed through the ETH element 200. The fourth heat zone 222 has the highest heat flux and the first heat zone 216 has the lowest.

It is worth noting that, when folded as shown in FIGS. 3A and 3B, the supply and return connectors 204, 206 are located at the same end of the ETH element 200. This has the advantage that less wiring is required to connect the ETH element 200 to the power system. Having the supply and return connectors 204, 206 located at substantially the same positions in a folded configuration may be achieved by folding the ETH element 200 an odd number of times (once in the case of FIG. 3A, three times as in the case of FIG. 3B). However, in some instances it is also possible to achieve this effect by folding the ETH element 200 an even number of times.

It is beneficial to have each adjacent layer of the sheet 202 in the stack electrically isolated from adjacent layers of the sheet 202 in the same heat zone, by an insulating material. For instance in the case of FIG. 3A an insulating layer may be provided between the two adjacent layers of the sheet 202 in the second heat zone 212. The insulating layer may be adhered to the upper side of the sheet 202 as a coating which is folded along with the sheet 202, or it may be provided as a separate un-folded layer that may be unattached to the sheet 202.

In the case of FIG. 3B, the insulating material may be provided as a single folded insulating layer which is adhered as a coating to the upper side of the sheet 202, or as individual and separate non-folded layers.

Figure 4:
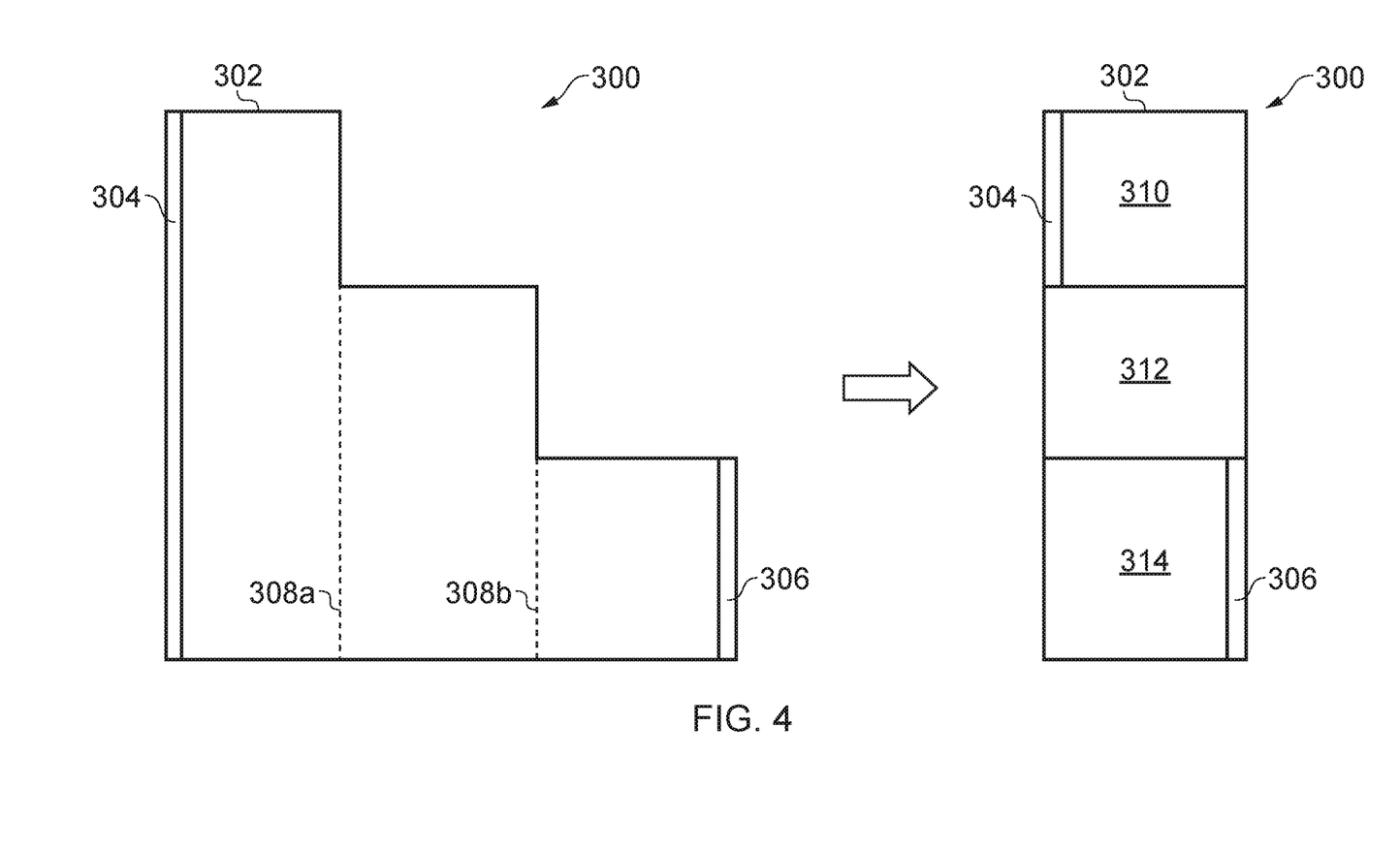
FIG. 4 shows a stepped electro-thermal heating element in unfolded and folded configurations.

FIG. 4 shows an ETH element 300, in unfolded and folded configurations. The ETH element 300 comprises a sheet 302 of electrically resistive material, a supply connector 304 and a return connector 306, both of which are busbars. The connectors 300, 304 are at opposite ends of the sheet 302.

The sheet 302 has a width which decreases in two steps between the opposite ends of the sheet.

As with the ETH element 200 described above, this change in width has an effect on the heat flux output in different portions of the sheet 302 due to the current density being higher in the portions of the sheet 302 having a smaller width than in the portions having a greater width. As a result, the heat flux generated in the areas of high current density, i.e. smaller width, will be higher than the heat flux generated in the areas of lower current density, i.e. greater width. For example, a portion of the sheet 302 at one end proximate to the return connector 306 will generate a higher heat flux than a portion of the sheet 302 at the opposite end proximate to the supply connector 304. This is because the portion of the sheet 302 proximate to the return connector 306 has a smaller width than the portion of the sheet proximate to the supply connector 304.

The folded configuration results from folding the sheet 302 in alternating directions about two fold lines 308a, 308b. Each fold line 308a, 308b runs across the width of the sheet 302, parallel to the busbars 304, 306.

The folded ETH element 300 has three heat zones 310, 312, 314. A first heat zone 310 has one layer of the sheet 302; a second heat zone 312 has a stack of two layers of the sheet 302; and a third heat zone 314 has a stack of three layers of the sheet 302. By having different numbers of layers of the sheet 302, each heat zone 310, 312, 314 is able to output a different heat flux than the other zones, regardless of the varying heat flux output due to the stepped width discussed above. This is described above and will not be repeated here for the sake of brevity.

Figure 5A:
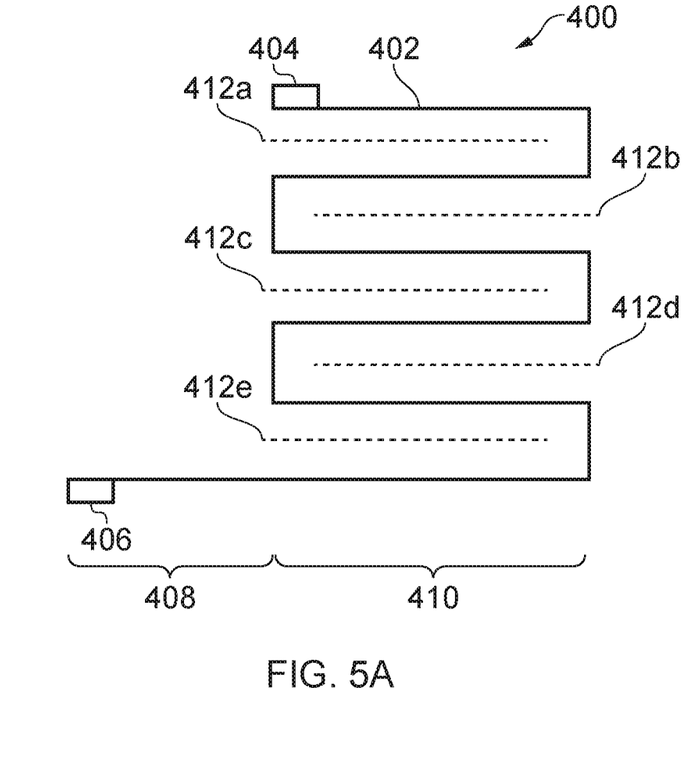
FIGS. 5A and 5B show side and top views of a folded electro-thermal heating element.
Figure 5B:
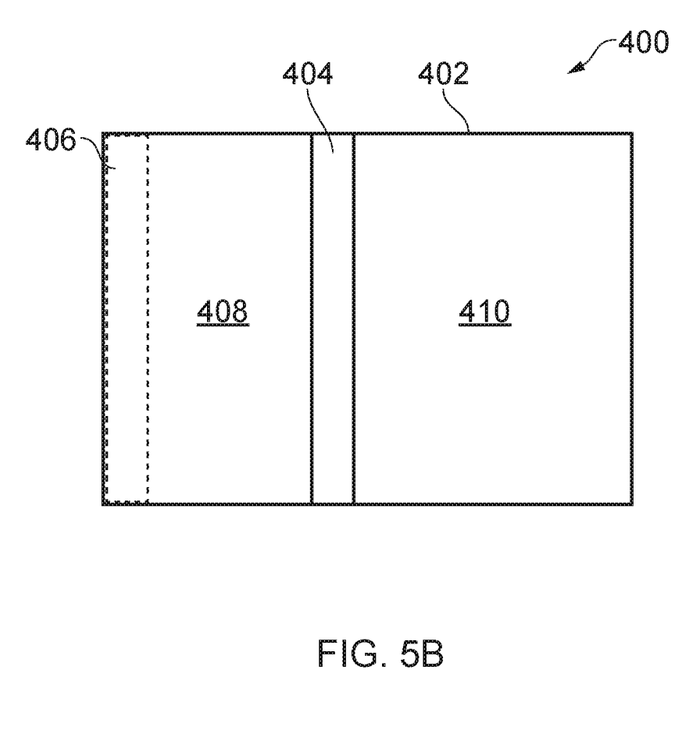

FIG. 5A shows a side view of a folded ETH element 400 and FIG. 5B shows a top-down view of the ETH element 400 of FIG. 5A. As with the embodiments described above, the ETH element 400 comprises a sheet 402 of carbon veil material, a supply connector 404 and a return connector 406 at opposite ends of the sheet 402. The folded ETH element 400 has first and second heat zones 408, 410, the second heat zone 410 having a stack of six layers.

As in FIG. 3B, the sheet 402 is folded in a series of folds with alternating folding directions (i.e. concertina-like folding). In other words, each fold is folded in the opposite direction to its neighbouring fold(s). Each fold runs across the width of the sheet 402, parallel to the busbars 404, 406.

In the second heat zone 410 each adjacent pair of layers is separated by a respective sheet 412a-412e of insulating material, such as glass fibre. In this arrangement there are five separate insulating sheets 412a-e.

Figure 6A:
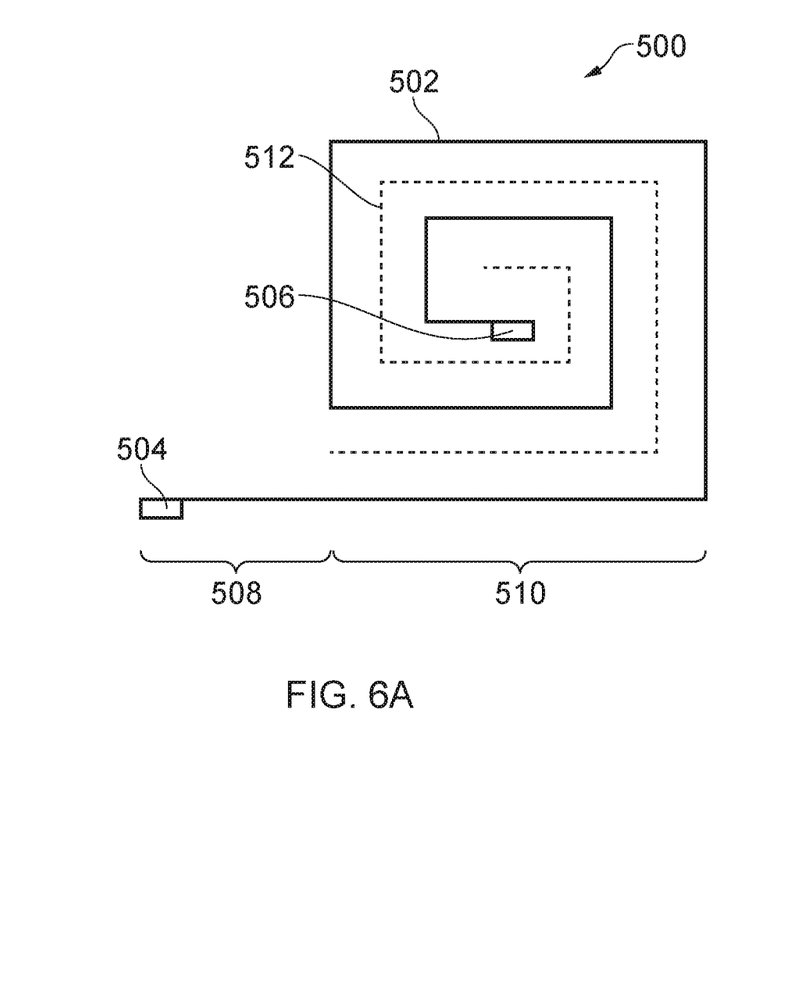
FIGS. 6A and 6B show side and top views of a folded electro-thermal heating element.
Figure 6B:
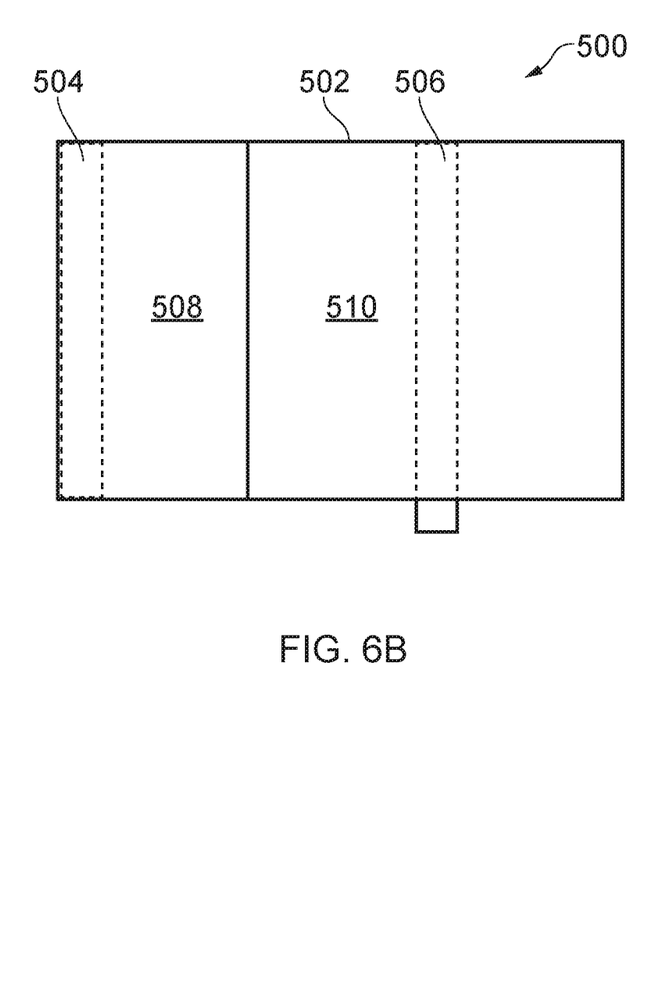

FIG. 6A shows a side view of a folded ETH element 500 and FIG. 5B shows a top-down view of the ETH element 500 of FIG. 6A. As with the embodiments described above, the ETH element 500 comprises a sheet 502 of electrically resistive material, a supply connector 504 and a return connector 506 at opposite ends of the sheet. The ETH element 500 further comprises first and second heat zones 508, 510 and a number of folds in the second heat zone 510. The two heat zones 508, 510 therefore have a different number of layers of the sheet 502.

The first heat zone 508 has a single layer, and the second heat zone 510 has a stack of five layers, resulting from four folds. The size of each fold is exaggerated in FIG. 6A for clarity. In this arrangement, the sheet 502 is folded in a series of folds with the same folding directions (i.e. spiral-like folding). In other words, each fold is folded in the same direction as its neighbouring fold(s).

Each fold runs across the width of the sheet 502, parallel to the busbars 504, 506.

Each layer of the sheet 502 is separated from adjacent layers of the sheet 502 in the second heat zone 510 by an insulating material, such as glass fibre. In this arrangement there is a single insulating layer 512 that is folded so as to provide the insulating material between the adjacent layers of the sheet 502.

It can also be seen from FIG. 6B that the length of return connector 506 is extended so that it protrudes beyond the width of the folded sheet 502. This means that despite being folded up inside the sheet 502, the return connector 506 is still accessible for wires/connections to be made to it.

Figure 7:
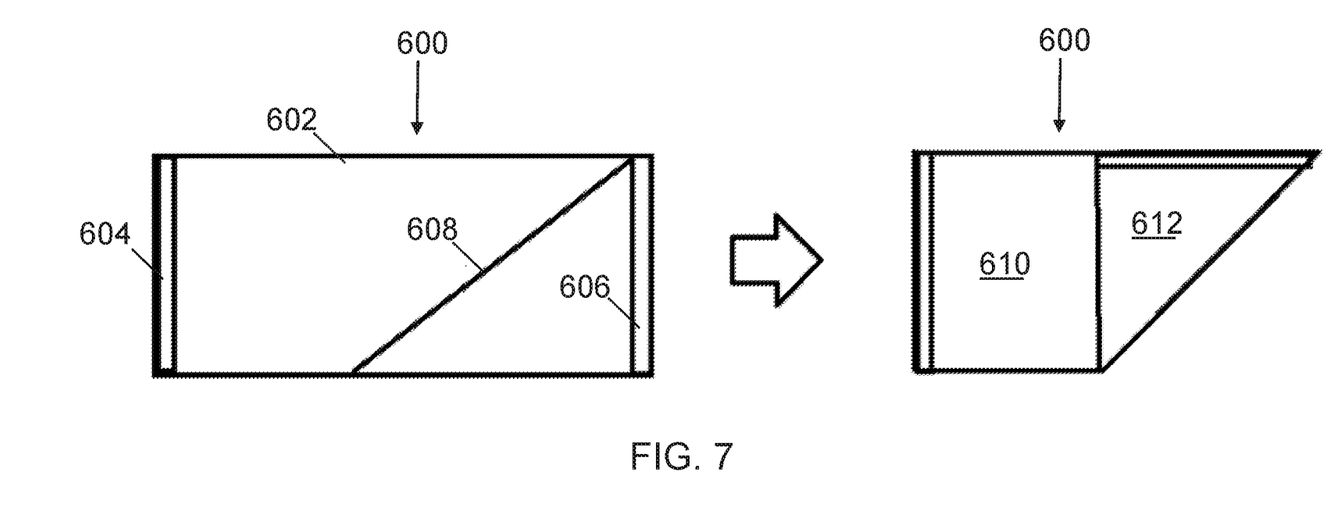
FIG. 7 shows an alternative electro-thermal heating element with an oblique fold line.

FIG. 7 shows an alternative ETH element 600 in both its unfolded and folded state. The ETH element 600 comprises a carbon fibre veil sheet 602, a supply busbar 604 and a return busbar 606 at opposite ends of the sheet. The sheet 602 is folded across its width about a fold line 608 which is at an oblique angle to the busbars 602, 604, to provide a pair of heat zones 610, 612.

Figure 8:
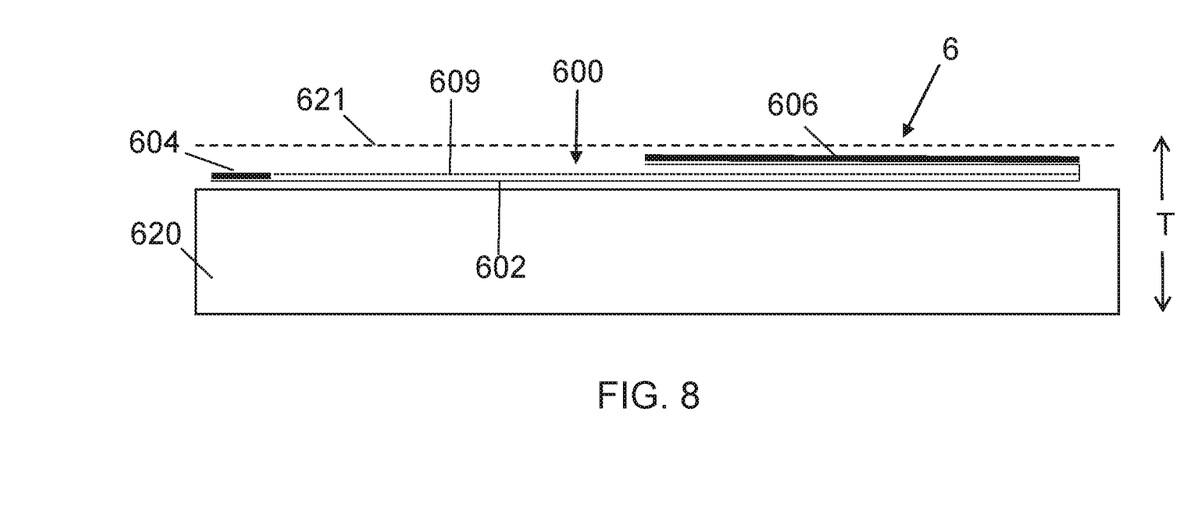
FIG. 8 is a cross-sectional view showing the electro-thermal heating element of FIG. 7 embedded within a blade shell.

FIG. 8 is a cross-sectional view showing how the ETH element 600 is embedded within a shell of the blade 6. The ECT elements 100, 200, 300, 400, 500 described above may be embedded in the blade shell of the blade 6 in a similar manner.

The shell comprises a laminar composite body 620 and a surface cover layer 621 which may include paint, primer and/or a metallic lightning protection layer. The ETH element 600 is embedded between the laminar composite body 620 and the surface cover layer 621.

An insulating layer 609 separates the adjacent pair of layers of the sheet 602 in the heat zone 612.

Note that the pair of busbars 604, 606 are carried by the sheet on opposite sides of the sheet, so that in the folded configuration they both face outwardly for ease of connection.

The electrical connectors in the embodiments described above may be on the same side of the sheet, or different sides (as in FIG. 8) as may be required and depending on the number of folds and manner of folding.

As shown in FIG. 8, the blade shell has a thickness direction T, and the layers of the sheet 602 are folded so that they form a stack in the thickness direction T of the blade shell.

Although the embodiments described above have specified certain numbers of layers of the folded sheet, it will be appreciated that any number of layers could be used in each heat zone, provided that at least two of the heat zones have a different number of layers of the sheet. For example, every heat zone may have more than one layer.

Similarly, there may be more than two heat zones. In the case of more than two heat zones, all heat zones may have a different number of layers of the sheet to each other (as in FIG. 3B for example), or some of the heat zones may comprise the same number of layers of the sheet, provided that at least two of the heat zones have a different number of layers of the sheet.

Although the invention has been described above with reference to one or more preferred embodiments, it will be appreciated that various changes or modifications may be made without departing from the scope of the invention as defined in the appended claims.

The invention claimed is:

1. A wind turbine blade comprising an electro-thermal heating element, the electro-thermal heating element comprising a sheet of electrically resistive material which is folded so as to provide a plurality of heat zones, each heat zone comprising one or more layers of the sheet, wherein at least two of the heat zones have a different number of layers of the sheet, and
    wherein a width of the sheet varies in one or more steps between opposite ends of the sheet, and wherein the sheet is folded along a fold line where a step of the one or more steps transitions to another portion of the sheet having a different width than the step.

2. The wind turbine blade according to claim 1, wherein each layer of the sheet is separated from adjacent layers of the sheet in the same heat zone by an insulating material.

3. The wind turbine blade according to claim 2, comprising an insulating layer, the insulating layer being folded so as to provide the insulating material between the adjacent layers of the sheet.

4. The wind turbine blade according to claim 1, wherein the electrically resistive material comprises a veil of carbon fibres.

5. The wind turbine blade according to claim 1, wherein the electro-thermal heating element is configured to heat the wind turbine blade with different heat fluxes in the at least two of the heat zones.

6. The wind turbine blade according to claim 1, wherein the electro-thermal heating element comprises a pair of electrical connectors at the opposite ends of the sheet.

7. The wind turbine blade according to claim 6, wherein the sheet is folded along its length.

8. The wind turbine blade according to claim 6, wherein the sheet is folded across its width.

9. The wind turbine blade according to claim 6, wherein at least one of the electrical connectors is a busbar.

10. The wind turbine blade according to claim 9, wherein the sheet is folded about one or more fold lines which are parallel or perpendicular to the busbar(s).

11. The wind turbine blade according to claim 1, wherein the sheet is folded in a series of folds with alternating folding directions.

12. The wind turbine blade according to claim 1, wherein the sheet is folded in a series of folds with the same folding direction.

13. The wind turbine blade according to claim 1, wherein the sheet is folded about at least two fold lines.

14. The wind turbine blade according to claim 1, wherein the sheet is folded about an odd number of fold lines.

15. The wind turbine blade according to claim 1, wherein each of the at least two of the heat zones comprises a plurality of layers of the sheet.

16. A method of heating a wind turbine blade, the wind turbine blade comprising an electro-thermal heating element, the electro-thermal heating element comprising a sheet of electrically conductive material which is folded to provide a plurality of heat zones, each heat zone comprising one or more layers of the sheet, wherein at least two of the heat zones have a different number of layers of the sheet, the method comprising:
powering the electro-thermal heating element such that the at least two of the heat zones heat the wind turbine blade with different heat fluxes, and
wherein a width of the sheet varies in one or more steps between opposite ends of the sheet, and wherein the sheet is folded along a fold line where a step of the one or more steps transitions to another portion of the sheet having a different width than the step.

17. A method of tailoring a heat flux output by an electro-thermal heating element of a wind turbine blade, the electro-thermal heating element comprising a sheet of electrically resistive material, the method comprising:
identifying heating requirements of the wind turbine blade; and folding the sheet of electrically resistive material so that a heat flux generated by the electro-thermal heating element is tailored to the heating requirements, wherein the sheet of electrically resistive material is folded to provide a plurality of heat zones, each heat zone comprising one or more layers of the sheet, and wherein at least two of the heat zones have a different number of layers of the sheet, and
wherein a width of the sheet varies in one or more steps between opposite ends of the sheet, and wherein the sheet is folded along a fold line where a step of the one or more steps transitions to another portion of the sheet having a different width than the step.

18. The method according to claim 17, wherein the heating requirements comprise an amount of heat flux generated in each of the heat zones, and/or a size of the heat zones, and/or a shape of the heat zones, and/or a number of the heat zones, and/or desired locations of the heat zones.

19. A wind turbine, comprising:
a tower;
a nacelle disposed on the tower;
a generator disposed in the nacelle;
a rotor coupled to the generator and having a distal end extending from the nacelle; and
a plurality of blades disposed on the distal end of the rotor; wherein at least one blade of the plurality of blades comprises:
an electro-thermal heating element, the electro-thermal heating element comprising a sheet of electrically resistive material which is folded so as to provide a plurality of heat zones, each heat zone comprising one or more layers of the sheet, wherein at least two of the heat zones have a different number of layers of the sheet, and
wherein a width of the sheet varies in one or more steps between opposite ends of the sheet, and wherein the sheet is folded along a fold line where a step of the one or more steps transitions to another portion of the sheet having a different width than the step.

* * * * *